United States Patent
Hu et al.

(10) Patent No.: US 11,546,215 B2
(45) Date of Patent: Jan. 3, 2023

(54) METHOD, SYSTEM, AND DEVICE FOR DATA FLOW METRIC ADJUSTMENT BASED ON COMMUNICATION LINK STATE

(71) Applicant: HUAWEI TECHNOLOGIES CO., LTD., Guangdong (CN)

(72) Inventors: Zhibo Hu, Beijing (CN); Junda Yao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/134,992

(22) Filed: Dec. 28, 2020

(65) Prior Publication Data

US 2021/0119870 A1 Apr. 22, 2021

Related U.S. Application Data

(63) Continuation of application No. PCT/CN2019/091507, filed on Jun. 17, 2019.

(30) Foreign Application Priority Data

Jun. 29, 2018 (CN) .......................... 201810711910.9

(51) Int. Cl.
*H04L 41/5009* (2022.01)
*H04L 41/5022* (2022.01)
(Continued)

(52) U.S. Cl.
CPC ...... *H04L 41/0823* (2013.01); *H04L 41/5009* (2013.01); *H04L 41/5022* (2013.01); *H04L 45/124* (2013.01)

(58) Field of Classification Search
None
See application file for complete search history.

(56) References Cited

U.S. PATENT DOCUMENTS 9,705,783 B2 7/2017 Prasad et al.
2002/0145981 A1 10/2002 Klinker et al.
(Continued)

FOREIGN PATENT DOCUMENTS

CN 101001203 A 7/2007
CN 101521601 A 9/2009
(Continued)

OTHER PUBLICATIONS

J.P. Vasseur, Ed et al., IGP Routing Protocol Extensions for Discovery of Traffic Engineering Node Capabilities, Network Working Group, Request for Comments: 5073, Dec. 2007, total 13 pages.
(Continued)

*Primary Examiner* — Joshua Joo
(74) *Attorney, Agent, or Firm* — Womble Bond Dickinson (US) LLP (57) ABSTRACT

Embodiments of this application provide a network optimization method, a network optimization system, and a network device, and relate to the communications field. A first network device adjusts, if it is detected that a communications link between the first network device and a second network device is in an abnormal state, a metric of at least one data flow received by the first network device; and the first network device selects a transmission path for the at least one data flow based on adjusted metric, and transmits the at least one data flow to the selected transmission path. In this way, load of the communications link is reduced, and the communications link is restored to a normal state.

18 Claims, 5 Drawing Sheets

(51) Int. Cl.
*H04L 41/0823* (2022.01)
*H04L 45/12* (2022.01)

(56) References Cited

U.S. PATENT DOCUMENTS

| | | | | |
|---|---|---|---|---|
| 2007/0140128 A1* | 6/2007 | Klinker | ................ | H04L 45/306 |
| | | | | 370/238 |
| 2008/0123532 A1* | 5/2008 | Ward | ................ | H04L 47/125 |
| | | | | 370/238 |
| 2008/0219268 A1 | 9/2008 | Dennison | | |
| 2009/0175172 A1 | 7/2009 | Prytz et al. | | |
| 2009/0274062 A1* | 11/2009 | Yan | ................ | H04L 61/6059 |
| | | | | 370/254 |
| 2011/0096780 A1* | 4/2011 | Darwish | ................ | H04L 45/507 |
| | | | | 370/392 |
| 2012/0320753 A1* | 12/2012 | Vasseur | ................ | H04L 45/22 |
| | | | | 370/237 |
| 2012/0320924 A1* | 12/2012 | Baliga | ................ | H04W 28/02 |
| | | | | 370/400 |
| 2013/0343396 A1* | 12/2013 | Yamashita | ............ | H04L 45/125 |
| | | | | 370/401 |
| 2014/0269691 A1 | 9/2014 | Xue et al. | | |
| 2015/0016247 A1* | 1/2015 | Hayes | ................ | H04L 47/127 |
| | | | | 370/230 |
| 2015/0063311 A1* | 3/2015 | Chindapol | ............ | H04W 36/22 |
| | | | | 370/332 |
| 2016/0294987 A1 | 10/2016 | Tian et al. | | |
| 2016/0352645 A1* | 12/2016 | Senarath | ............. | H04L 41/5025 |
| 2018/0048691 A1* | 2/2018 | Pruden | ................ | H04L 47/2433 |
| 2019/0158371 A1* | 5/2019 | Dillon | ................ | H04L 43/087 |

FOREIGN PATENT DOCUMENTS

| | | |
|---|---|---|
| CN | 102075444 A | 5/2011 |
| CN | 102088451 A | 6/2011 |
| CN | 103559089 A | 2/2014 |
| CN | 104426855 A | 3/2015 |
| CN | 105519055 B | 3/2019 |

OTHER PUBLICATIONS

Xu Gang et al., Anomaly Detection Algorithm of Data Center Network Based on LSDB, 2018, 16 pages.

* cited by examiner

METHOD, SYSTEM, AND DEVICE FOR DATA FLOW METRIC ADJUSTMENT BASED ON COMMUNICATION LINK STATE

CROSS-REFERENCE TO RELATED APPLICATIONS

This application is a continuation of International Application No. PCT/CN2019/091507, filed on Jun. 17, 2019, which claims priority to Chinese Patent Application No. 201810711910.9, filed on Jun. 29, 2018. The disclosures of the aforementioned applications are hereby incorporated by reference in their entireties.

TECHNICAL FIELD

Embodiments of this application relate to the communications field, and in particular, to a network optimization method, a network optimization system, and a network device.

BACKGROUND

Through a distributed traffic engineering technology, a transmission path is selected for a data flow mainly based on an interior gateway protocol (IGP). In other words, a shortest path is selected by calculating an IGP metric of each transmission path, to transmit the data flow.

However, an existing distributed traffic engineering technology has the following problems because a shortest path algorithm is used.

When congestion occurs on a selected shortest path, the data flow (a data flow being transmitted or a data flow newly delivered) on the shortest path is still transmitted on the path according to the shortest path algorithm. This increases link load, and affects data flow transmission quality.

SUMMARY

This application provides a network optimization method, a network optimization system, and a network device, to accurately detect network congestion, timely adjust a transmission path of a data flow, and effectively improve flexibility of network optimization.

To achieve the foregoing objective, the following technical solutions are used in this application.

According to a first aspect, a network optimization method is provided. The method may include:

If a first network device detects that a communications link between the first network device and a second network device is in an abnormal state, the first network device adjusts a metric of at least one data flow received, where the metric is used to select a transmission path for the data flow corresponding to the metric. The first network device selects the transmission path for the at least one data flow based on the adjusted metric. The first network device transmits the at least one data flow to the selected transmission path.

According to the network optimization method provided in this application, a network device can obtain a running state of a communications link in real time by monitoring the communications link between the network device and a device that are in communication connection, to detect in time whether the communications link is abnormal. In addition, when detecting that the communications link is abnormal, the network device adjusts a metric of at least one data flow on the communications link, and adjusts the data flow to another path for transmission, to reduce load on the abnormal link. Apparently, compared with the prior art, this embodiment of the present invention has at least one of the following advantages:

(1) The abnormal state of the communications link is accurately and timely detected, and when the communications link is in the abnormal state, some data flows are adjusted to the another transmission path, to reduce pressure on the communications link.

(2) A dynamic network optimization scheme is proposed according to the shortest path algorithm. This effectively improves flexibility of network optimization.

In an implementation, the method may further include: dividing an IGP metric of the communications link, to obtain the metric of the at least one data flow.

By using the foregoing method, mapping between a data flow and an IGP metric is implemented, in other words, each data flow corresponds to a metric obtained by dividing the IGP metric, so that a specified data flow is adjusted to the another transmission path by adjusting a metric corresponding to the data flow.

In an implementation, the dividing, by the first network device, an IGP metric includes: obtaining data information of the at least one data flow, where the data information includes at least service level agreement (SLA) information and priority information; dividing the IGP metric into a plurality of metric subsets based on SLA types indicated by the SLA information of the at least one data flow, where each metric subset corresponds to one SLA type; dividing each metric subset into a plurality of sub-metrics based on priority information of a data flow corresponding to each SLA type, where each sub-metric is a metric of the corresponding data flow; and recording the plurality of sub-metrics and attribute information of the plurality of sub-metrics, where the attribute information is used to indicate an SLA type and priority information of the data flow corresponding to each of the plurality of sub-metrics.

In an implementation, the IGP metric of the communications link is divided based on the SLA types and the priority information of the data flow, so that each data flow transmitted on the communications link corresponds to a respective metric, and the metric corresponding to each data flow may be adjusted to adjust the transmission path of the data flow. In this way, the transmission path of the data flow is adjusted.

In an implementation, the method may further include: matching the data information of the at least one data flow with the attribute information of the plurality of sub-metrics; and correspondingly recording, in the database, identification information of the at least one data flow and identification information of a plurality of sub-metrics that successfully match the at least one data flow, where the identification information of the data flow is used to uniquely identify the data flow, and the identification information of the metric is used to uniquely identify the metric.

In the foregoing manner, a mapping relationship between the data flow and the metric is established, so that each data flow has a corresponding metric.

In an implementation, adjusting a metric includes: obtaining abnormal state information of the communications link, where the abnormal state information includes at least an abnormal state type of the communications link; matching the abnormal state information with the SLA types; obtaining a target metric subset corresponding to a successfully matched SLA type; and adjusting at least one sub-metric in the target metric subset based on priority information of data flows corresponding to all sub-metrics in the target metric subset.

In the foregoing manner, the transmission path of the at least one data flow on the communications link in the abnormal state is dynamically adjusted, to reduce pressure on the communications link.

In an implementation, adjusting a metric of a data flow includes: obtaining a data flow with a lowest priority in the data flows corresponding to all the sub-metrics in the target metric subset; and adjusting a sub-metric corresponding to the data flow with the lowest priority to a specified value.

In the foregoing manner, the data flow with the low priority is adjusted to another path, to reduce pressure on the communications link, and increase a transmission rate of another data flow with a relatively high priority.

In an implementation, adjusting a metric of a data flow may further include: if the data flows corresponding to all the sub-metrics in the target metric subset have the same priority information, requesting, from a control device, to modify the priority information of the data flows corresponding to all the sub-metrics in the target metric subset; and adjusting, by the first network device, sub-metrics in the target metric subset based on modified priority information.

In the foregoing manner, when the data flows have the same priority information, gradient division is performed on the data flows by modifying the priority information of the data flows.

In an implementation, the method further includes: obtaining, by the first network device, parameter information of the communications link; determining whether the parameter information is continuously lower than a recovery threshold within predetermined duration; and if the parameter information is continuously lower than the recovery threshold within the predetermined duration, adjusting, by the first network device, a last adjusted sub-metric to an initial value.

In the foregoing manner, excessively low load and resource utilization of an adjusted communications link are avoided.

In an implementation, the method further includes: if the selected transmission path is still the communications link, adjusting, by the first network device, based on priority information of data flows corresponding to other unadjusted sub-metrics in the target metric subset, at least one sub-metric in the other unadjusted sub-metrics.

In the foregoing manner, when the adjusted data flow does not have another link, load of the communications link is reduced by adjusting the metric of the another data flow.

In an embodiment, the method further includes: if the transmission path reselected by the first network device for the data flow is in the abnormal state, adjusting an adjusted sub-metric to an initial value; and generating, by the first network device, alarm information, to notify the first network device that a system to which the first network device belongs is in an abnormal state.

In the foregoing manner, insufficient network system capacity can be accurately detected in time.

In an implementation, a manner in which the first network device determines whether the communications link between the first network device and the second network device is in the abnormal state includes: obtaining, by the first network device, the parameter information of the communications link; determining whether the parameter information continuously exceeds a threshold-crossing value within the predetermined duration; and if the parameter information continuously exceeds the threshold-crossing value within the predetermined duration, determining that the communications link is in the abnormal state.

In the foregoing manner, the first network device can accurately locate the abnormal state of the communications link in time.

According to a second aspect, a network device is provided. The network device may include:

an adjustment module, configured to: if it is detected that a communications link between the first network device and a second network device is in an abnormal state, adjust a metric of at least one data flow received by the first network device, where the metric is used to select a transmission path for the data flow corresponding to the metric;

a selection module, configured to select the transmission path for the at least one data flow based on the adjusted metric; and a transmission module, configured to transmit the at least one data flow to the selected transmission path.

In an implementation, the network device further includes:

a division module, configured to divide an internal gateway protocol IGP metric of the communications link, to obtain the metric of the at least one data flow.

In an implementation, the division module is further configured to:

obtain data information of the at least one data flow, where the data information includes at least service level agreement SLA information and priority information;

divide the IGP metric into a plurality of metric subsets based on SLA types indicated by the SLA information of the at least one data flow, where each metric subset corresponds to one SLA type;

divide each metric subset into a plurality of sub-metrics based on priority information of a data flow corresponding to each SLA type, where each sub-metric is a metric of the corresponding data flow; and record the plurality of sub-metrics and attribute information of the plurality of sub-metrics, where the attribute information is used to indicate an SLA type and priority information of the data flow corresponding to each of the plurality of sub-metrics.

In an embodiment, the network device may further include:

a matching module, configured to match the data information of the at least one data flow with attribute information of the plurality of sub-metrics; and a recording module, configured to correspondingly record, in the database, identification information of the at least one data flow and identification information of a plurality of sub-metrics that successfully match the at least one data flow, where the identification information of the data flow is used to uniquely identify the data flow, and the identification information of the metric is used to uniquely identify the metric.

In an implementation, the adjustment module is further configured to: obtain abnormal state information of the communications link, where the abnormal state information includes at least an abnormal state type of the communications link; match the abnormal state information with the SLA types; obtain a target metric subset corresponding to a successfully matched SLA type; and adjust at least one sub-metric in the target metric subset based on priority information of data flows corresponding to all sub-metrics in the target metric subset.

In an implementation, the adjustment module is further configured to: obtain a data flow with a lowest priority in the data flows corresponding to all the sub-metrics in the target metric subset; and adjust a sub-metric corresponding to the data flow with the lowest priority to a specified value.

In an implementation, the adjustment module is further configured to: if the data flows corresponding to all the sub-metrics in the target metric subset have the same priority information, request, from a control device, to modify the priority information of the data flows corresponding to all the sub-metrics in the target metric subset; and adjust the sub-metrics in the target metric subset based on modified priority information.

In an implementation, the network device further includes: a first state monitoring module, configured to obtain parameter information of the communications link; the first state monitoring module is further configured to determine whether the parameter information is continuously lower than a recovery threshold within predetermined duration; and if the determining module determines that the parameter information is continuously lower than a recovery threshold within predetermined duration, the adjustment module adjusts a last adjusted sub-metric to an initial value.

In an implementation, the adjustment module is further configured to: if the selected transmission path is still the communications link, adjust, based on priority information of data flows corresponding to other unadjusted sub-metrics in the target metric subset, at least one sub-metric in the other unadjusted sub-metrics.

In an implementation, the adjustment module is further configured to: if the selected transmission path is in the abnormal state, adjust an adjusted sub-metric to an initial value; and the network device further includes an alarm module, configured to generate alarm information, to notify the first network device that a system to which the first network device belongs is in an abnormal state.

In an implementation, the network device further includes a second state monitoring module, configured to: obtain the parameter information of the communications link; determine whether the parameter information continuously exceeds a threshold-crossing value within the predetermined duration; and if the parameter information continuously exceeds the threshold-crossing value within the predetermined duration, determine that the communications link is in the abnormal state.

According to a third aspect, a network optimization system is provided. The system includes a first network device and a second network device, where the first network device is configured to: if it is detected that a communications link between the first network device and the second network device is in an abnormal state, adjust a metric of at least one data flow received by the first network device, where the metric is used to select a transmission path for the data flow corresponding to the metric; the first network device is further configured to select the transmission path for the at least one data flow based on the adjusted metric; and the first network device is further configured to transmit the at least one data flow to the selected transmission path.

In an implementation, the system may further include a control device. The device is configured to receive a request message sent by the first network device, where the request message is used to request, from the control device, to adjust priority information of the at least one data flow. The control device is further configured to send a request response message to the first network device based on a user instruction, where the request response message carries adjusted priority information of the at least one data flow.

According to a fourth aspect, a control device is provided. The control device may be configured to receive a request message sent by a first network device, where the request message is used to request, from the control device, to adjust priority information of at least one data flow. The control device is further configured to send a request response message to the first network device, where the request response message carries adjusted priority information of the at least one data flow.

According to a fourth aspect, a computer-readable storage medium is provided. The computer-readable storage medium stores a computer program, the computer program includes at least one segment of code, and the at least one segment of code may be executed by a network device, to control the network device to execute the program designed in the first aspect.

According to a fifth aspect, a computer program is provided. When being executed by a network device, the computer program is used to execute the program designed in the first aspect.

The program may be all or partially stored in a storage medium that is encapsulated with the processor, or may be all or partially stored in a memory that is not encapsulated with the processor.

According to a sixth aspect, a network device is provided, including a memory and a processor. The memory is coupled to the processor. The processor is configured to execute the program designed in the first aspect.

According to a seventh aspect, a processor is provided. The processor includes at least one circuit, configured to: if it is detected that a communications link between a first network device and a second network device is in an abnormal state, adjust a metric of at least one data flow received by the first network device, where the metric is used to select a transmission path for the data flow corresponding to the metric; select the transmission path for the at least one data flow based on an adjusted metric; and transmit the at least one data flow to the selected transmission path. The processor may be a chip.

According to a seventh aspect, a control device is provided. The control device includes a memory and a processor. The memory stores a computer program. After the computer program is executed by the processor, the processor is configured to: receive a request message sent by a first network device, where the request message is used to request, from a control device, to adjust priority information of at least one data flow; and return a response message based on the request message, where the request response message carries adjusted priority information of the at least one data flow, the priority information of the at least one data flow is used by the first network device to adjust a metric of the at least one data flow, and the metric is used to select a transmission path for the data flow corresponding to the metric.

In a first optional implementation of the seventh aspect, the control device adjusts the priority information of the at least one data flow based on a user instruction, or adjusts the priority information of the at least one data flow based on a priority adjustment requirement carried in the request message sent by the first network device.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and so on are intended to distinguish between different objects but do not indicate a particular order of the objects. For example, the first target object, the second target object, and the like are used to distinguish between different target objects, but are not used to describe a specific order of the target objects.

In addition, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a relative concept in a specific manner.

In the description of the embodiment of this application, unless otherwise stated, "a plurality of" means two or more than two. For example, the plurality of processing units refer to two or more processing units. A plurality of systems refers to two or more systems.

Figure 1:
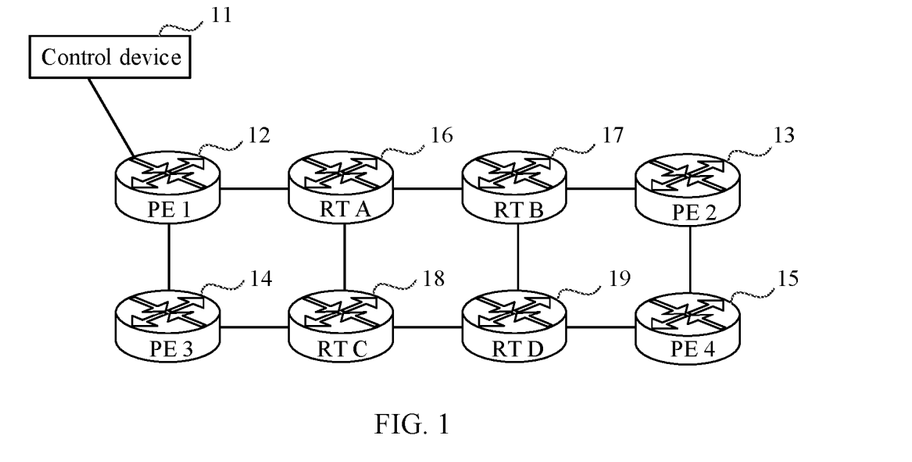
FIG. 1 is a schematic diagram of an application scenario according to an embodiment of this application.

Before the technical solutions in the embodiments of this application are described, an application scenario of the embodiments of this application is first described with reference to the accompanying drawings. FIG. 1 is a schematic diagram of an application scenario according to an embodiment of this application. In this application scenario, there are a control device 11, provider edge (PE) devices 1 to 4 which are respectively numbered 12 to 15, and routers (RT) A to D which are numbered 16 to 19. In a specific implementation process of this embodiment of this application, it should be noted that a quantity of devices in the application scenario shown in FIG. 1 is merely an example. This is not limited in this application.

A specific implementation solution of this application is described below with reference to the schematic diagram of the application scenario shown in FIG. 1.

Embodiment 1

Figure 2:
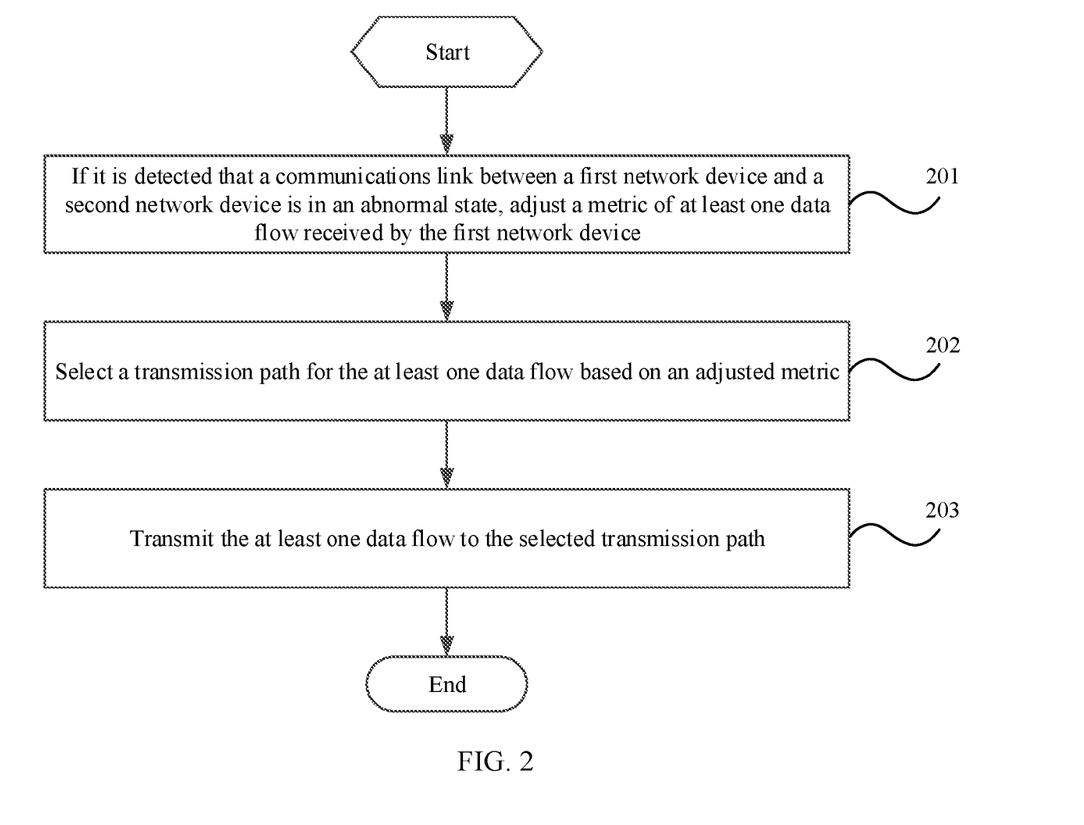
FIG. 2 is a flowchart 1 of a network optimization method according to an embodiment of this application.

With reference to FIG. 1, FIG. 2 is a flowchart of a network optimization method according to an embodiment of this application. The method shown in FIG. 2 includes the following operations.

S201: If detecting that a communications link between the first network device and a second network device is in an abnormal state, a first network device adjusts a metric of at least one data flow received by the first network device.

In an embodiment of this application, the network optimization method may be applied to any device that can implement a routing function on a network. The following uses an example in which an RT A in FIG. 1 is used as the first network device in this embodiment of this application for detailed description. Before the data flow is transmitted, a network manager may divide, based on data information of data flows delivered by a control device or an ingress device (in this embodiment, a PE is the ingress device), an IGP metric of the communications link between the first device (the RT A) and the second device (in this embodiment, an RT B is used as the second device for detailed description). In this embodiment of this application, the IGP metric of the communications link between routing devices is divided based on service level agreement (SLA) types of the data flows and a quantity and priority information of the data flows of each SLA type. By dividing the IGP metric, each data flow in the at least one data flow transmitted between the RT A and the RT B corresponds to a metric, and when each data flow is transmitted on a network, the RT A calculates a next-hop path based on the metric corresponding to the data flow. In this embodiment of this application, a manner in which the RT A obtains the SLA types and priorities of the data flows is as follows: The data flows carry parameters used to indicate the SLA types and the priorities, and the RT A may obtain, by reading the parameters, the SLA types and the priority information that correspond to the data flows. The SLA types and the priority information indicated in the parameter are set by the network manager when the data flows are generated.

An IGP metric division rule is still described in detail below by using an example in which the RT A is the first device and the RT B is the second device.

In the prior art, the communications link between the routing devices on the network has a corresponding IGP metric. In a data flow transmission process, each routing device calculates, based on the IGP metric between the routing device and a routing device that is connected to the routing device, a shortest path for transmitting each data flow, to minimize a cost of transmitting the data flow. In other words, an IGP metric of a communications link is a cost required for transmitting a data flow on the communications link. Still referring to FIG. 2, if the IGP metric of each link is 10, and in the prior art, if a PE 1 delivers a data flow to the network and a destination address of the data flow is a PE 2, after receiving the data flow, the RT A calculates a link cost by using the IGP metric of each link. In other words, if the data flow is transmitted from the RT A to the PE 2, a transmission path 1 that may be used is RT A-RT B-PE 2, or a transmission path 2 is RT A-RT C-RT D-RT B-PE 2. After link cost calculation, a link cost of the transmission path 1 is calculated by the RT A, in other words, a total IGP metric is 20. A link cost of the transmission path 2 is calculated, in other words, a total IGP metric is 40. Therefore, the RT A selects the transmission path 1 as the shortest path, and transmits the data flow on the path. It is clear that in the prior art, all data sent from the PE 1 to the PE 2 pass through the path. When data traffic is relatively heavy, path load is excessively heavy, transmission rates of all data flows are affected, and user experience is reduced.

According to the network optimization method in an embodiment of this application, and according to a shortest path algorithm of a distributed network algorithm, the data flow is associated with the metric by extending the IGP metric, and a transmission path of the data flow is adjusted by adjusting the metric.

Figure 3:
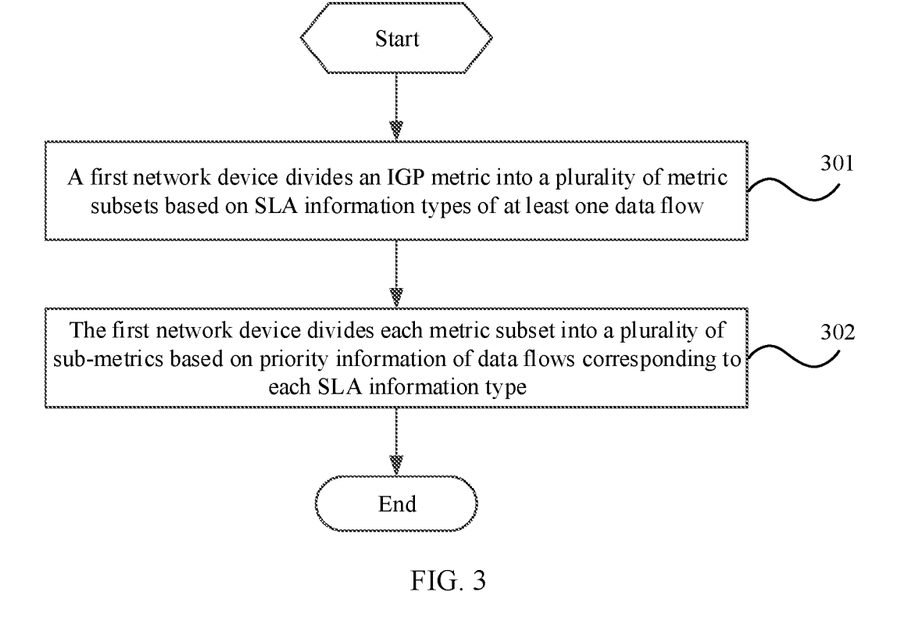
FIG. 3 is a flowchart of IGP metric division operations according to an embodiment of this application.

FIG. 3 is a flowchart of IGP metric division operations according to an embodiment of this application. In this embodiment of this application, before an ingress node delivers a data flow, a network manager plans an IGP metric of each routing device on a network. A communications link between an RT A and an RT B is still used as an example.

S301: A first network device divides an IGP metric into a plurality of metric subsets based on SLA information types of at least one data flow. The IGP metric between the RT A and the RT B is 10 (the value is merely an example, and is not limited in this application). If the SLA types of the at least one data flow sent by a PE 1 to a PE 2 include a bandwidth service level (which indicates a bandwidth requirement of the data flow) and a delay service level (which indicates a delay requirement of the data flow), only the foregoing two SLA types are used as an example in this embodiment of this application. In another embodiment, the data flow may include a plurality of SLA types. This is not limited in this application.

The RT A divides the IGP metric into the plurality of metric subsets based on the SLA types of the data flows that are to be received (in other words, the plurality of data flows that the PE 1 delivers to the RT A). Each metric subset corresponds to one SLA type. The RT A divides each metric subset into a plurality of sub-metrics based on priority information of a data flow corresponding to each SLA type. For example, if five data flows delivered by the PE 1 to the RT A are respectively data flows 1 to 5, and SLA types and priorities of the five data flows are as follows: SLA types of data flows 1 to 3 are the bandwidth service level, and priorities of the data flows 1 to 3 are respectively priorities 1 to 3 (where 1 is the highest priority); and SLA types of data flows 4 and 5 are the delay service levels, and priorities of the data flows 4 and 5 are priority 1 and priority 2, respectively. Therefore, when dividing the IGP metric, the RT A divides the IGP metric into two metric subsets, which are respectively a bandwidth metric subset and a delay metric subset.

S302: The first network device divides each metric subset into the plurality of sub-metrics based on the priority information of the data flows corresponding to each SLA information type. The bandwidth value subset is used as an example. The RT A performs attribute division on the metric based on the priority information of the data flows of the bandwidth service level. For example, if there are four data flows of the bandwidth service level, and priorities corresponding to the data flows 1 to 4 from high to low are respectively priorities 1 to 4 (the priority value is only used to intuitively reflect priorities, and in other embodiments, priorities may be identified in other manners). The RT A divides the bandwidth metric subset into four metrics, which are respectively a metric 1 to a metric 4, and attribute information of the four metrics is respectively a priority 1 to a priority 4. In other words, the metric 1 corresponds to the highest priority 1, and so on. In this embodiment of this application, after dividing the IGP metric, the RT A records the attribute information of each metric obtained after the division. The attribute information includes an SLA type and priority information of a corresponding data flow. In an embodiment, the RT A records, in a system database, identification information and the attribute information corresponding to each metric, so that in a subsequent use process, a required correspondence is searched by invoking data in the database. In a process of recording the metric and the related attribute information, the RTA may record the metric and the related attribute information based on a sequence of the priority information of the data flow corresponding to the metric. Still the foregoing parameters are used as an example, the priorities corresponding to the metrics 1 to 4 are 1 to 4, respectively, and the sequence recorded in the database is the metric 1 and the related content thereof, then the metric 2 and the related content thereof, and so on. Therefore, in a process of adjusting a metric, the RT A can directly determine that a metric in the last entry recorded in the database is a metric corresponding to a data flow with a lowest priority. It should be noted that all routing devices on the network may perform operations in the embodiments of this application. Herein, only the RT A is used as an example for description.

Subsequently, the RT A is still used as an example. After the data flows are delivered, the RT A receives the data flows, and detects an SLA type of each data flow. The foregoing parameters are still used as an example for description. The RT A detects the data flows 1 to 4 belonging to the bandwidth service level, continues to detect the priority levels of the data flows 1 to 4, and obtains the priority levels, which are respectively 1 to 4. Therefore, the RT A detects the corresponding metric subset, namely, the bandwidth metric subset, in the plurality of metric subsets of the locally divided IGP metric. In addition, the RT A obtains the attribute information of each metric in the bandwidth metric subset, in other words, the attribute information corresponding to the metrics 1 to 4 is the priorities 1 to 4, respectively. Subsequently, the RT A matches the data flows with the corresponding metrics based on the priority information of the data flows 1 to 4 and the recorded attribute information of the metrics. For example, the priority of the data flow 1 is 1, and a correspondence is established between the data flow 1 and the metric 1 whose priority is 1. Then, the RT A records the correspondence between the data flow and the metric into the database. The following table lists a data table in the database.

| Data flow identification information | metric identification information | SLA type corresponding to the metric | Priority information corresponding to the metric |
|---|---|---|---|
| Data flow 1 | Metric 1 | Bandwidth service level | Priority 1 |
| Data flow 2 | Metric 2 | Bandwidth service level | Priority 2 |
| Data flow 3 | Metric 3 | Bandwidth service level | Priority 3 |
| Data flow 4 | Metric 4 | Bandwidth service level | Priority 4 |

The data flow identification information is used to uniquely identify the data flow, and the metric identification information is used to uniquely identify the metric. As shown in the foregoing table, the data flow 4 is a data flow with a lowest priority in the plurality of data flows, and an entry to which the data flow 4 belongs is located at an end of the data table. Therefore, when adjusting the metric, the RT A directly obtains the last entry in the data table, that is, the metric corresponding to the data flow with the lowest priority. It should be noted that the foregoing table is only a data table corresponding to the bandwidth service level metric subset. In this embodiment of this application, each service level metric subset may correspond to one data table. In other embodiments, all data flows and related information of corresponding metrics may also be written into the same data table. In this embodiment, when querying the metric corresponding to the data flow with the lowest priority, the RT A may determine that the last entry of a same SLA type is the metric corresponding to the data flow with the lowest priority.

In another embodiment, the priority information may also be represented by information such as bandwidth usage or delay. For example, a data flow occupying the least bandwidth has the lowest priority. The RT A may associate the data flow with the metric based on the priority information. For example, the SLA types of the metrics 1 to 4 are the bandwidth service level, and the priority information of the metrics 1 to 4 are the priorities 1 to 4. In a bandwidth usage scenario, the priorities 1 to 4 indicate bandwidth usage of the corresponding data flows in descending order. A specific association process is similar to that in the priority embodiment. Details are not described herein again.

In an embodiment of this application, after establishing the relationship between the data flow and the metric, the RT A calculates, based on the metric of the data flow, a shortest path corresponding to the data flow, and transmits the data flow on the calculated shortest path.

In an embodiment of this application, the RT A monitors in real time a state of the communications link between the RT A and the RT B, including a state such as bandwidth usage or a delay.

In an embodiment, if the bandwidth usage of the communications link between the RT A and the RT B exceeds a threshold-crossing value V1 (the threshold-crossing value may be set by the network manager based on an actual requirement, for example, the threshold-crossing value may be set to 80% of the bandwidth usage), the RT A continues to monitor the communications link. If the bandwidth usage of the communications link continuously exceeds V1 within predetermined duration T1, the RT A determines that the communications link is abnormal, and an exception type is a bandwidth exception. In another embodiment, the abnormal state type of the communications link between the RT A and the RT B may also be a delay exception or the like. In this application, only the bandwidth exception type is used as an example. A processing manner of another abnormal state is similar to a processing manner of the bandwidth exception type. Details are not described herein again.

The RT A matches the abnormal state type of the communications link between the RT A and the RT B with the local metric subset, to obtain the bandwidth metric subset. Then, the RT A adjusts the metric of the data flow with the lowest priority in the data flows corresponding to the metrics in the bandwidth metric subset.

The RT A obtains the metric of the data flow with the lowest priority in the data flows corresponding to the metrics in the bandwidth metric subset. In this embodiment of this application, the RT A may obtain, by querying the data table in the database, that the priority indicated in the attribute information of the metric 4 is the priority 4, and may determine that the data flow corresponding to the metric 4 is the data flow with the lowest priority. Therefore, when the RT A determines that the data flow corresponding to the metric 4 is the data flow with the lowest priority, the RT A may adjust the metric 4. In another embodiment, if the priority information is represented by information such as bandwidth usage or a delay, for example, a data flow that occupies the minimum bandwidth has the lowest priority. For example, if the priority information is represented by the bandwidth usage, when the metric is adjusted, the RTA adjusts, to a specified value, the metric of the data flow that occupies the minimum bandwidth and that is in the at least one data flow. An adjustment manner of other types of priority information is similar to that of the priority information. Examples are not described one by one in this application.

In this embodiment of this application, the RT A adjusts the metric 4 to the specified value. In an embodiment, the specified value may be a maximum value, for example, 10000. In another embodiment, the specified value is greater than a maximum path cost on the network. For example, if the path cost on the network, that is, an IGP metric corresponding to the maximum path on which the data flow is transmitted from the RT A to the PE 1, is 30, the specified value is any integer value greater than 30.

S202: The first network device selects the transmission path for the at least one data flow based on an adjusted metric.

In an embodiment of this application, the RT A recalculates the transmission path of the data flow 4 based on the adjusted metric (namely, the specified value) of the data flow 4, to calculate that the shortest transmission path of the data flow 4 is RT A-RT C-RT D-RT B-PE 2, and the link cost, namely, the IGP metric, is 40. Therefore, the RT A selects the path as the forwarding path of the data flow 4, to adjust transmission paths of some data flows on the abnormal-state communications link, to alleviate load of the abnormal-state communications link.

In an embodiment of this application, after adjusting the metric of the data flow 4, the RT A continues to monitor the communications link between the RT A and the RT B. If the communications link is still in the abnormal state, the RT A continues to adjust a metric corresponding to a data flow with the lowest priority in current data flows until the communications link recovers to a normal state.

In addition, in an embodiment, if the path reselected by the RT A for the data flow 4 is still the communications link between the RT A and the RT B, it indicates that there is no backup path for the communications link, and the RT A adjusts the metric of the data flow 4 to an initial value, and adjusts the metric of the data flow with the lowest priority in the data flows except the data flow 4, that is, the metric of the data flow 3.

In another embodiment, if the communications link between the RT A and the RT C becomes abnormal after the RT A adjusts the data flow on the communications link between the RT A and the RT B to another path, for example, the path RT A-RT C-RT D-RT B-PE 2, the RT A restores the metric of the adjusted data flow to the initial value, namely, the IGP metric, and then the RT A sends alarm information to notify the administrator that the communications link on the current network is overloaded and the network needs to be expanded.

S203: The first network device transmits the at least one data flow to the selected transmission path.

In conclusion, in the network optimization solution provided in this embodiment of this application, the IGP metric is statically divided, and the data flow received by the first network device is associated with the divided metric, to calculate the transmission path of the corresponding data flow based on the associated metric. In this way, when the communications link is congested, the transmission path of the at least one data flow that has been transmitted or is to be transmitted on the congested link may be dynamically adjusted by adjusting the metric corresponding to the data flow, to alleviate load of the congested link and restore the congested link.

Embodiment 2

Figure 4:
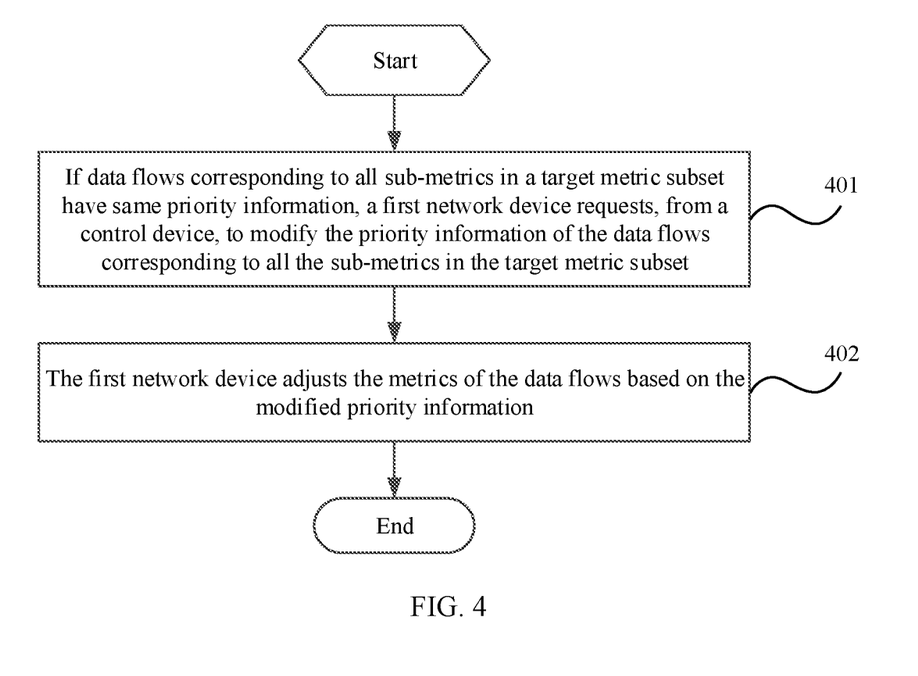
FIG. 4 is a flowchart 2 of a network optimization method according to an embodiment of this application.

With reference to FIG. 1 and FIG. 2, as shown in FIG. 4, in this embodiment of this application, the S201 in FIG. 2 may further include the following operations.

S401: If data flows corresponding to all sub-metrics in a target metric subset have same priority information, a first network device requests, from a control device, to modify the priority information of the data flows corresponding to all the sub-metrics in the target metric subset.

An RT A is still used as an example. If the RTA detects, in a metric adjustment process, that all data flows have same metric information, in other words, all data flows correspond to a same metric, the first network device requests, from the control device to modify the priority information of the plurality of data flows.

When the IGP metric is divided, a static division form is used, in other words, the IGP metric is divided based on SLA types and priorities of the existing data flows. Therefore, in an embodiment, an SLA type and a priority of a data flow newly received by the RT A may be the same as those of the data flow for which static configuration is completed. In this case, data flows with the same SLA type and priority are matched to a same metric. In another embodiment, when the IGP metric is statically divided, all data flows delivered by the PE 1 may have a same priority. Therefore, when the IGP metric is divided, an operator may still divide the IGP metric into a plurality of subsets corresponding to different SLA types, where each subset of the SLA type may include a plurality of metrics corresponding to data flows of different priorities. In this embodiment, after receiving data flows with a same SLA type and a same priority, the RT A matches the data flows to a same metric. Therefore, in an embodiment of this application, if the same metric may correspond to the plurality of data flows with the same priority, when the metric is adjusted, the plurality of data flows corresponding to the metric are simultaneously adjusted to another transmission path. In this case, a backup path, namely, the reselected transmission path, may be overloaded and become abnormal, and load of an original transmission path is excessively low. This reduces resource utilization. In this case, when detecting that the communications link is abnormal, the RT A may request, from the control device, to adjust the priorities of the plurality of data flows corresponding to the metric.

In an embodiment, a manager may preset a threshold. When the RT A detects that the communications link is abnormal, if the RT A detects that there are a plurality of data flows with a lowest priority, and a quantity of the data flows with the lowest priority exceeds the preset threshold, the RT A requests, from the control device, to adjust the priorities of the data flows. The RT A obtains data information of the data flows corresponding to the metric, and sends the data information to the control device. After receiving the data information, the control device may adjust the priorities of the data flows according to an instruction triggered by the manager. The manager may set, based on an actual requirement, the priorities of the data flows in the request sent by the RT A. Then, the control device sends the set data flow and the priority information corresponding to the data flows to the PE 1, namely, an ingress device. The PE 1 broadcasts the set data flow and priority information.

S402: The first network device adjusts the metrics of the data flows based on the modified priority information. In this embodiment of this application, after receiving the message broadcast by the PE 1, the RTA correspondingly updates the priority information of the data flows. After updating the priority information of the data flows, the RT A may re-establish a correspondence between the data flows and the metrics, and adjust the metrics of the data flows according to the method described in a scenario 1. It should be noted that, in an embodiment, if one metric corresponds to the plurality of data flows, but a quantity of the data flows corresponding to the metric does not exceed the preset threshold, when the metric is adjusted, the plurality of data flows may be adjusted to the another transmission path at the same time. For example, if the preset threshold is five, when the RT A detects that there are six data flows that correspond to the metric and that are of the lowest priority, adjusting the six data flows to the backup path at the same time may cause excessive pressure on the backup path and excessively low load and low resource utilization on the current communications link. Therefore, the RT A needs to request, from the control device, to modify the priority information of the six data flows.

For a specific process, refer to the foregoing detailed description about how to adjust the metrics of the data flows in an abnormal case. Details are not described herein again.

Embodiment 3

Figure 5:
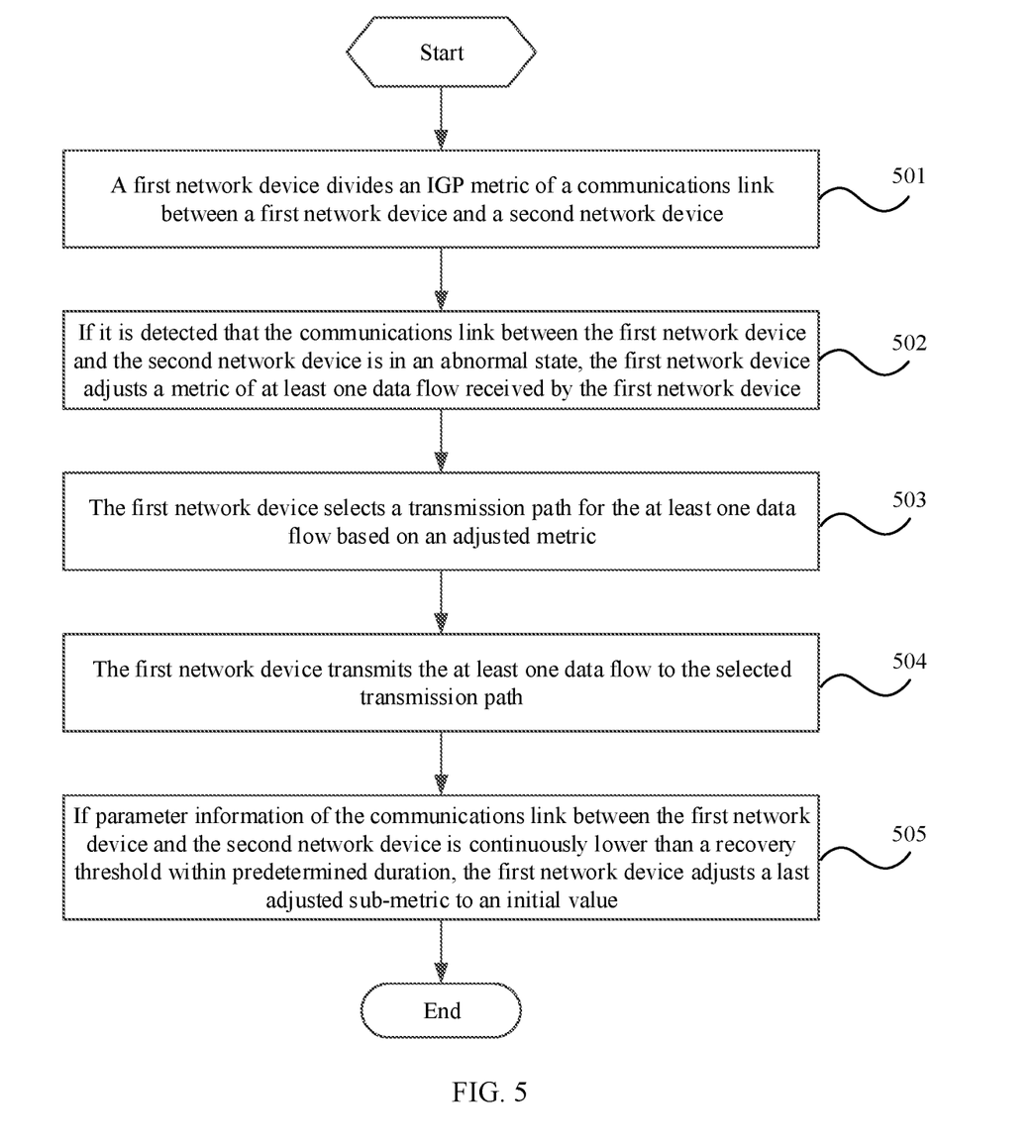
FIG. 5 is a flowchart 3 of a network optimization method according to an embodiment of this application.

With reference to FIG. 1, FIG. 5 is a flowchart of a network optimization method according to an embodiment of this application.

S501: A first network device divides an IGP metric of a communications link between a first network device and a second network device.

S502: if it is detected that the communications link between the first network device and the second network device is in an abnormal state, the first network device adjusts a metric of at least one data flow received by the first network device.

S503: The first network device selects a transmission path for the at least one data flow based on an adjusted metric.

S504: The first network device transmits the at least one data flow to the selected transmission path.

For a specific process, refer to the foregoing detailed description about how to adjust the metrics of the data flows in an abnormal case. Details are not described herein again.

S505: If parameter information of the communications link between the first network device and the second network device is continuously lower than a recovery threshold within predetermined duration, the first network device adjusts a last adjusted sub-metric to an initial value. In this embodiment of this application, after adjusting the metric for a plurality of times and restoring the communications link between the first network device and the second network device to a normal state, the first network device continues to monitor the state of the communications link and obtain the parameter information of the communications link. The parameter information includes parameters such as bandwidth usage and a delay. If at least one piece of parameter information in the parameter information is continuously lower than a recovery threshold V2 corresponding to the parameter information within predetermined duration T2 (the predetermined duration T2 may be the same as or different from the predetermined duration T1 described above, and the specific duration is set by a manager based on an actual situation), the first network device may determine that lode of the current communications link is excessively low, and may restore the last adjusted metric to the initial value, namely, the IGP metric, so that the data flow corresponding to the metric is transmitted again on the communications link between the first network device and the second network device. In this embodiment of this application, the foregoing operation may be repeated for a plurality of times. To be specific, when the load of the communications link is excessively low, the last adjusted metric is restored to the initial value, until the state of the communications link is restored to normal, in other words, the parameter information is higher than the recovery threshold V2.

The foregoing mainly describes the solutions provided in the embodiments of the present invention from a perspective of interaction between network elements. It may be understood that, to implement the foregoing functions, the network device includes a corresponding hardware structure and/or software module for implementing each function. A person of ordinary skill in the art should easily be aware that, in combination with the examples described in the embodiments disclosed in this specification, units, algorithms, and operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, functional modules of the network device may be obtained according to the foregoing method embodiment. For example, the functional modules may be obtained through division corresponding to functions, or two or more functions may be integrated into one processing module. The integrated module may be implemented in a form of hardware, or may be implemented in a form of a software functional module. It should be noted that, in this embodiment of the present invention, module division is exemplary, and is merely a logical function division. In actual implementation, another division manner may be used.

Figure 6:
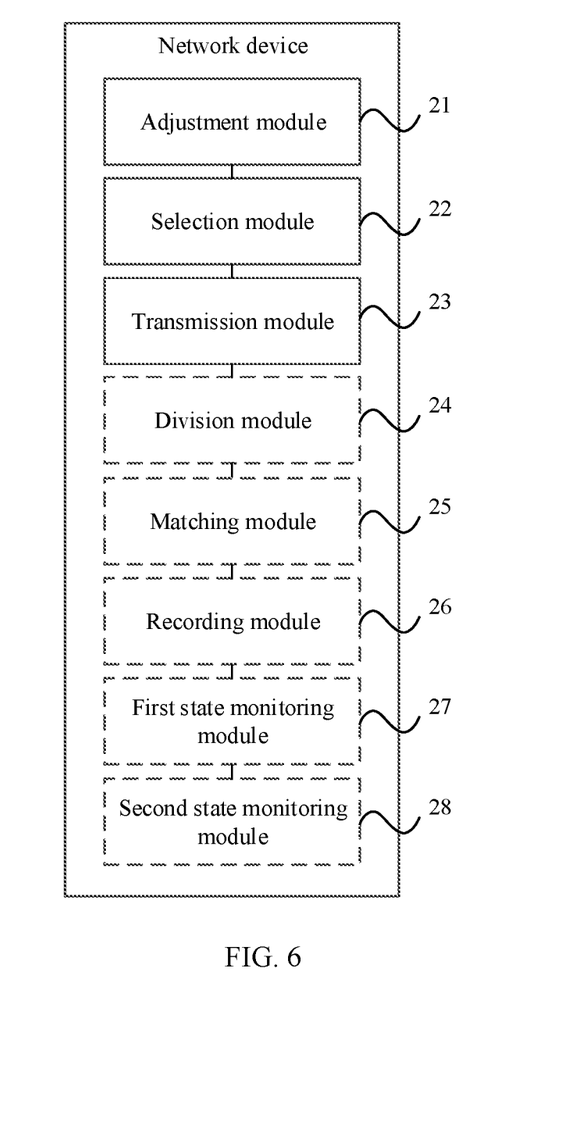
FIG. 6 is a schematic structural diagram of a network device according to an embodiment of this application.

When each functional module is obtained through division based on each corresponding function, FIG. 6 is a possible schematic structural diagram of the network device in the foregoing embodiment. As shown in FIG. 6, the network device may include an adjustment module 21, a selection module 22, and a transmission module 23. The adjustment module 21 may be configured to: if it is detected that the communications link between the first network device and the second network device is in the abnormal state, adjust the metric of the at least one data flow received by the first network device, where the metric is used to select the transmission path for the data flow corresponding to the metric. The adjustment module 21 may be further configured to support the network device in performing the S201, the S402, the S403, the S502, and the S505 in the foregoing method embodiments. The selection module 22 may be configured to select the transmission path for the at least one data flow based on the adjusted metric. The selection module 22 may be further configured to support the network device in performing the S202, the S404, and the S503 in the foregoing method embodiment. The transmission module 23 may be configured to transmit the at least one data flow to the selected transmission path. The transmission module 23 may be further configured to perform the S203, the S405, and the S504 in the foregoing method embodiment.

In an embodiment, as shown in FIG. 6, the network device may further include a division module 24, a matching module 25, a recording module 26, a first state monitoring module 27, and a second state monitoring module 28. The division module 24 may be configured to support the network device in performing the S301 to the S302, the S401, and the S501 in the foregoing embodiment, that is, "dividing an IGP metric". The matching module 25 is configured to support the network device in performing "matching the data flows with the corresponding metrics" in the foregoing embodiment. The recording module 26 is configured to support the network device in performing "recording the correspondence between the data flow and the metric into the database" in the foregoing embodiment. The first state detection module 27 and the second state monitoring module 28 are configured to support the network device in performing "monitoring the state of the communications link" in the foregoing embodiments. All related content of the operations in the foregoing method embodiments may be cited in function descriptions of corresponding functional modules. Details are not described herein again.

Based on a same technical concept, an embodiment of this application further provides a network optimization apparatus, to implement the foregoing method embodiment.

Based on a same technical concept, an embodiment of this application further provides a computer-readable storage medium. The computer-readable storage medium stores a computer program, the computer program includes at least one segment of code, and the at least one segment of code may be executed by a network device, to control the network device to implement the foregoing method embodiments.

Based on a same technical concept, an embodiment of this application further provides a computer program. When the computer program is executed by a network device, the computer program is used to implement the foregoing method embodiment.

The program may be all or partially stored in a storage medium that is encapsulated with the processor, or may be all or partially stored in a memory that is not encapsulated with the processor.

Based on a same technical concept, an embodiment of this application further provides a processor. The processor is configured to implement the foregoing method embodiment. The processor may be a chip.

Figure 7:
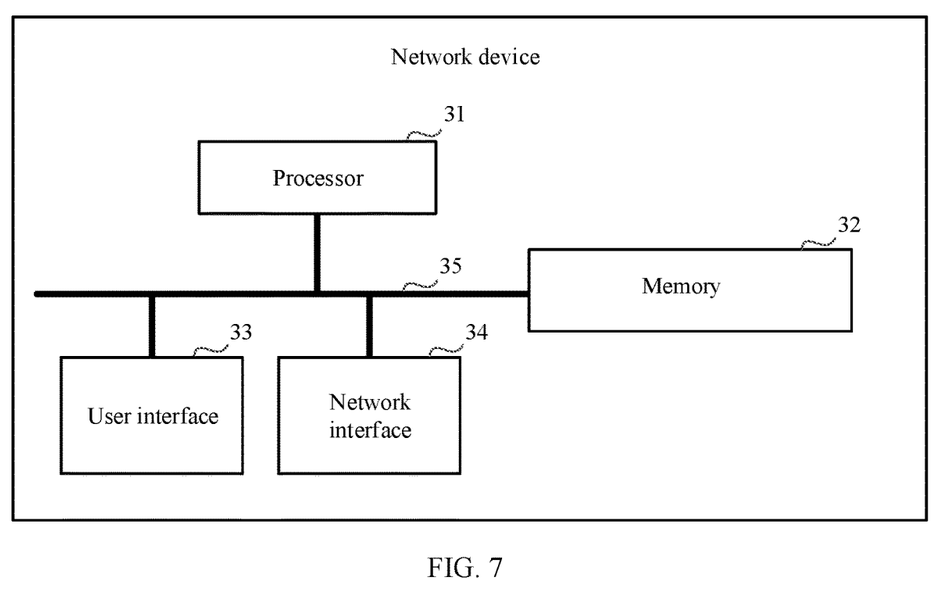
FIG. 7 is a block diagram of a network device according to an embodiment of this application.

Based on a same technical concept, an embodiment of this application further provides a network device, including a memory and a processor. The memory is coupled to the processor. The processor is configured to implement the foregoing method embodiments. FIG. 7 is a structural block diagram of a network device according to an embodiment of this application. The network device includes at least one processor 31, a memory 32, at least one network interface 34, and a user interface 33. All the components in the network device are coupled together by using a bus system 35. It may be understood that the bus system 35 is configured to implement a connection and communication between these components. The bus system 35 may further include a power bus, a control bus, a state signal bus, and the like, in addition to a data bus. However, for clear description, various types of buses in FIG. 7 are marked as the bus system 35.

The memory 32 stores a computer program, and after the program is executed by the processor 31, the network device can perform the operations in FIG. 2 to FIG. 5.

Methods or algorithm operations described in combination with the content disclosed in this embodiment of the present invention may be implemented by hardware, or may be implemented by a processor by executing a software instruction. The software instruction may include a corresponding software module. The software module may be stored in a random access memory (RAM for short), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in network equipment. Certainly, the processor and the storage medium may exist in network equipment as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A network optimization method, comprising:
   obtaining correspondence between priority information of a data flow and a metric, wherein the metric is used to select a transmission path for the data flow;
   dividing an internal gateway protocol (IGP) metric of a communications link to obtain the metric;
   in response to detecting that the communications link between a first network device and a second network device is in an abnormal state, adjusting the metric based on the correspondence;
   selecting a transmission path for a first data flow received by the first network device based on the adjusted metric and priority information of the first data flow; and
   transmitting the first data flow to the selected transmission path;
   wherein the metric is corresponding to the first data flow, and dividing the IGP metric comprises:
   obtaining data information of a plurality of data flows received by the first network device, wherein the first data flow is one of the plurality of data flows, wherein the data information comprises at least SLA information and priority information, and
   dividing the IGP metric into a plurality of metric subsets based on SLA types indicated by the SLA information of the plurality of data flows, wherein each metric subset corresponds to one SLA type.

2. The method according to claim 1, wherein dividing the IGP metric further comprises:
   dividing each metric subset into a plurality of sub-metrics, wherein each sub-metric represents a metric corresponding to the corresponding data flow; and
   recording the plurality of sub-metrics and attribute information of the plurality of sub-metrics, wherein the attribute information is used to indicate an SLA type and priority information of the data flow corresponding to each of the plurality of sub-metrics.

3. The method according to claim 2, further comprising:
   matching the data information of the plurality of data flows with the attribute information of the plurality of sub-metrics; and
   recording, in a database, identification information of the plurality of data flows and identification information of a plurality of sub-metrics that match the plurality of data flows, wherein identification information of each data flow of the plurality of data flows is used to uniquely identify the respective data flow, and identification information of each sub-metrics of the plurality of sub-metrics is used to uniquely identify the respective sub-metrics.

4. The method according to claim 2, wherein the adjusting comprises:
   obtaining abnormal state information of the communications link, wherein the abnormal state information comprises at least an abnormal state type of the communications link;
   matching the abnormal state information with the SLA types;
   obtaining a target metric subset corresponding to a matched SLA type; and
   adjusting at least one sub-metric in the target metric subset based on priority information of data flows corresponding to all sub-metrics in the target metric subset.

5. The method according to claim 1, wherein determining whether the communications link is in the abnormal state comprises:
   obtaining parameter information of the communications link;
   determining whether the parameter information exceeds a threshold-crossing value within a predetermined duration; and
   when the parameter information exceeds the threshold-crossing value within the predetermined duration, determining that the communications link is in the abnormal state.

6. A network device operating as a first network device, comprising:
   a processor that executes software instructions, the processor configured to:
   obtain correspondence between priority information of a data flow and a metric, wherein the metric is used to select a transmission path for the data flow;
   divide an internal gateway protocol (IGP) metric of a communications link to obtain the metric;

in response to detecting that the communications link between the first network device and a second network device is in an abnormal state, adjust the metric based on the correspondence;

select a transmission path for a first data flow received by the first network device based on the adjusted metric and priority information of the first data flow; and transmit the first data flow to the selected transmission path;

wherein the metric is corresponding to the first data flow, and dividing the IGP metric comprises:

obtaining data information of a plurality of data flows received by the first network device, wherein the first data flow is one of the plurality of data flows, wherein the data information comprises at least SLA information and priority information, and dividing the IGP metric into a plurality of metric subsets based on SLA types indicated by the SLA information of the plurality of data flows, wherein each metric subset corresponds to one SLA type.

7. The network device according to claim 6, wherein dividing the IGP metric further comprises:

dividing each metric subset into a plurality of sub-metrics, wherein each sub-metric represents a metric corresponding to the corresponding data flow; and recording the plurality of sub-metrics and attribute information of the plurality of sub-metrics, wherein the attribute information is used to indicate an SLA type and priority information of the data flow corresponding to each of the plurality of sub-metrics.

8. The network device according to claim 7, wherein the processor is further configured to:

match the data information of the plurality of data flows with attribute information of the plurality of sub-metrics; and record, in a database, identification information of the plurality of data flows and identification information of a plurality of sub-metrics that match the plurality of data flows, wherein identification information of each data flow of the plurality of data flows is used to uniquely identify the respective data flow, and identification information of each sub-metrics of the plurality of sub-metrics is used to uniquely identify the respective sub-metrics.

9. The network device according to claim 7, wherein the processor is further configured to:

obtain abnormal state information of the communications link, wherein the abnormal state information comprises at least an abnormal state type of the communications link;

match the abnormal state information with the SLA types;

obtain a target metric subset corresponding to a matched SLA type; and adjust at least one sub-metric in the target metric subset based on priority information of data flows corresponding to all sub-metrics in the target metric subset.

10. The network device according to claim 9, wherein the processor is further configured to:

obtain a data flow with a lowest priority in the data flows corresponding to all the sub-metrics in the target metric subset; and adjust a sub-metric corresponding to the data flow with the lowest priority to a specified value.

11. The network device according to claim 9, wherein the processor is further configured to:

when the data flows corresponding to all the sub-metrics in the target metric subset have the same priority information, request, from a control device, to modify the priority information of the data flows corresponding to all the sub-metrics in the target metric subset; and adjust the sub-metrics in the target metric subset based on modified priority information.

12. The network device according to claim 9, wherein the processor is further configured to:

obtain parameter information of the communications link;

determine whether the parameter information is lower than a recovery threshold within predetermined duration; and when it is determined that the parameter information is lower than the recovery threshold within the predetermined duration, adjust a last adjusted sub-metric to an initial value.

13. The network device according to claim 9, wherein the processor is further configured to:

when the selected transmission path is still the communications link, adjust, based on priority information of data flows corresponding to other unadjusted sub-metrics in the target metric subset, at least one sub-metric in the other unadjusted sub-metrics.

14. The network device according to claim 9, wherein the processor is further configured to:

when the selected transmission path is in the abnormal state, adjust an adjusted sub-metric to an initial value; and generate alarm information to notify the first network device that a system to which the first network device belongs is in the abnormal state.

15. The network device according to claim 6, wherein the processor is further configured to:

obtain parameter information of the communications link;

determine whether the parameter information exceeds a threshold-crossing value within a predetermined duration; and when the parameter information exceeds the threshold-crossing value within the predetermined duration, determine that the communications link is in the abnormal state.

16. A network optimization system, comprising:

a second network device; and a first network device comprising a processor that executes software instructions, the processor configured to:

obtain correspondence between priority information of a data flow and a metric, wherein the metric is used to select a transmission path for the data flow;

divide an internal gateway protocol (IGP) metric of a communications link to obtain the metric;

in response to detecting that the communications link between the first network device and the second network device is in an abnormal state, adjust the metric based on the correspondence;

select a transmission path for a first data flow received by the first network device based on the adjusted metric and priority information of the first data flow; and transmit the first data flow to the selected transmission path;

wherein the metric is corresponding to the first data flow, and dividing the IGP metric comprises:

obtaining data information of a plurality of data flows received by the first network device, wherein the first data flow is one of the plurality of data flows, wherein the data information comprises at least SLA information and priority information, and dividing the IGP metric into a plurality of metric subsets based on SLA types indicated by the SLA information of the plurality of data flows, wherein each metric subset corresponds to one SLA type.

17. The system according to claim 16, further comprising a control device configured to receive a request message from the first network device, wherein the request message is used to request to adjust priority information of a plurality of data flows received by the first network device, wherein the first data flow is included in the plurality of data flows; and send a request response message to the first network device, wherein the request response message includes adjusted priority information of the plurality of data flows.

18. A non-transitory computer-readable storage medium, wherein the computer-readable storage medium stores a computer program, the computer program comprises at least one segment of code, which when executed by a network device, cause the network device to perform the method according to claim 1.

\* \* \* \* \*